Figure 6:
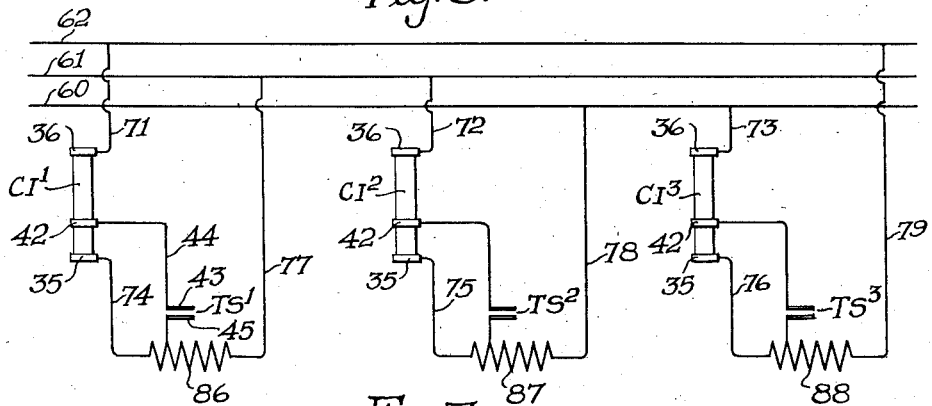

March 15, 1932. J. H. STARR 1,849,117
ELECTRIC PROTECTIVE SYSTEM
Filed April 24, 1930 6 Sheets-Sheet 1
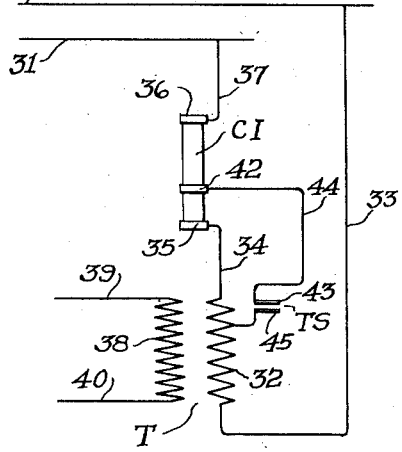
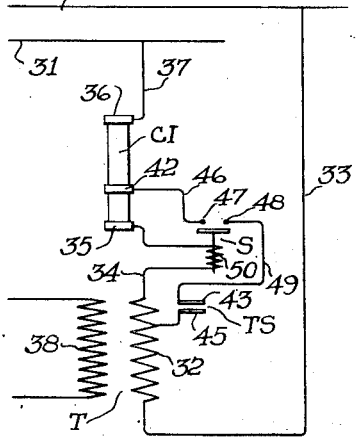
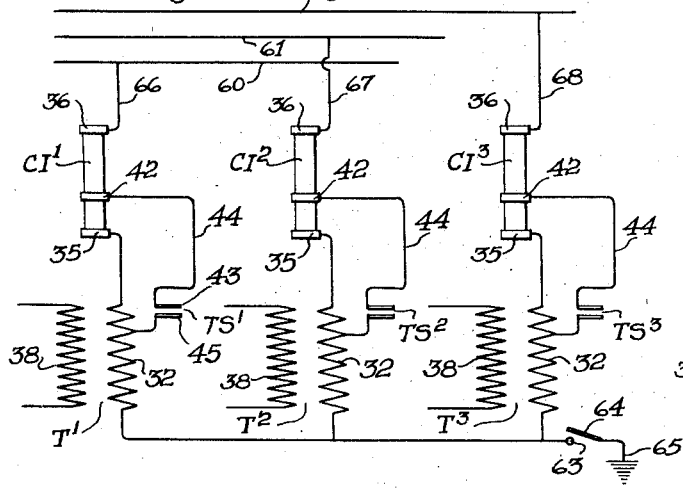
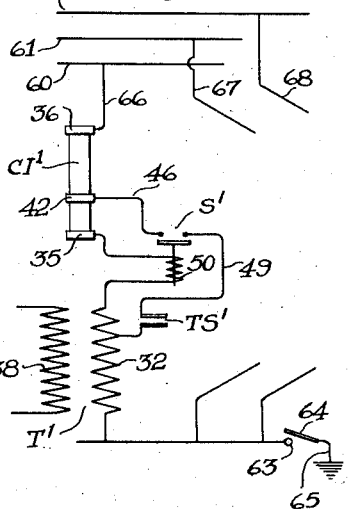
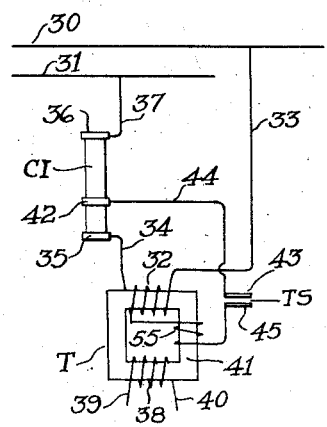
INVENTOR.
James H. Starr
BY Thomas H. Ferguson
ATTORNEY.

March 15, 1932.  J. H. STARR  1,849,117
ELECTRIC PROTECTIVE SYSTEM
Filed April 24, 1930  6 Sheets-Sheet 3
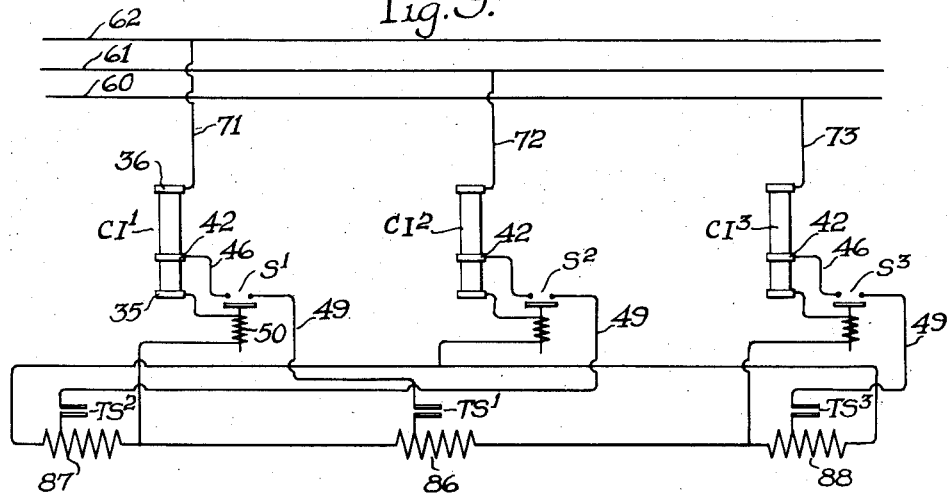
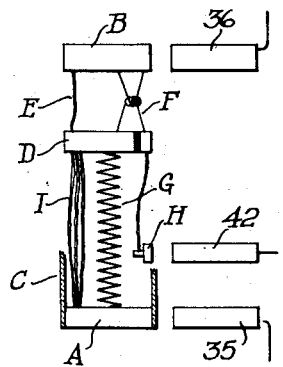
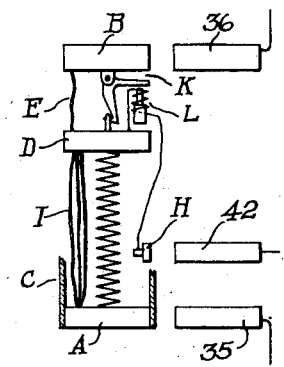
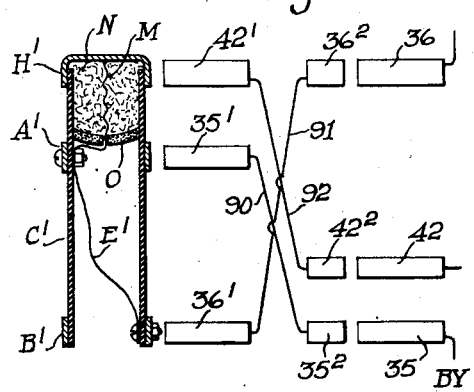
INVENTOR.
James H. Starr
BY Thomas H. Ferguson
ATTORNEY.

March 15, 1932.    J. H. STARR    1,849,117
ELECTRIC PROTECTIVE SYSTEM
Filed April 24, 1930    6 Sheets-Sheet 4
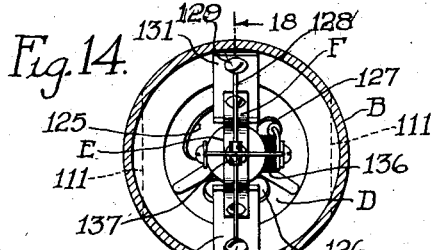
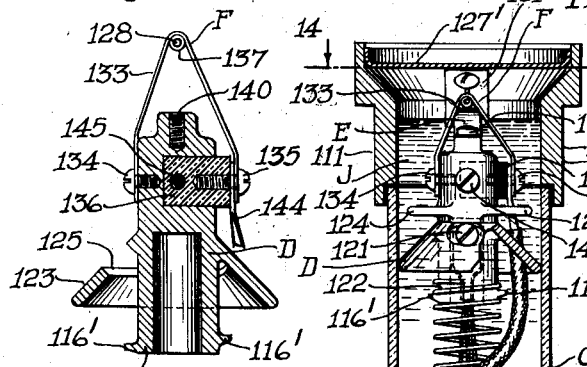
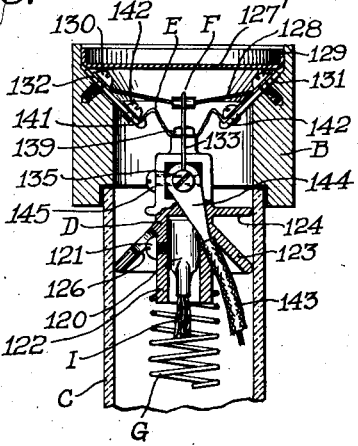
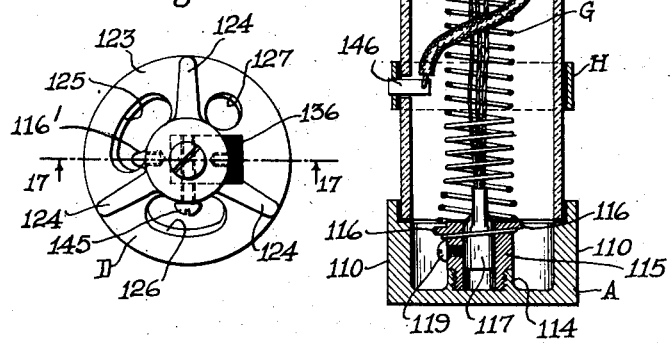
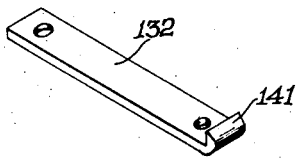
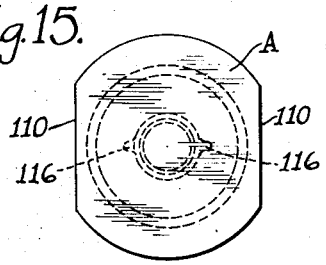
INVENTOR.
James H. Starr
BY Thomas H. Ferguson
ATTORNEY.

March 15, 1932. J. H. STARR 1,849,117
ELECTRIC PROTECTIVE SYSTEM
Filed April 24, 1930 6 Sheets-Sheet 6

INVENTOR.
James H. Starr
BY Thomas H. Ferguson
ATTORNEY.

Patented Mar. 15, 1932

1,849,117

UNITED STATES PATENT OFFICE

JAMES H. STARR, OF OAK PARK, ILLINOIS, ASSIGNOR TO ELECTRICAL ENGINEERS EQUIPMENT COMPANY, A CORPORATION OF ILLINOIS

ELECTRIC PROTECTIVE SYSTEM

Application filed April 24, 1930. Serial No. 446,968.

The present invention relates to electric protective systems and has to do primarily with protecting electric translating devices, such as transformers, generators, motors, or like equipment, against injury under those exceptional conditions which arise in the regular operation of electric systems employing such devices, such conditions including heavy overloads, short circuits, prolonged light overloads, heavy current surges, reversals in the direction of the flow of energy, excessive temperatures in the equipment protected, and the like.

One object of the present invention is to provide a protective system of the class mentioned wherein a simple and economical circuit interrupter may be used. To this end, the new system is designed to suit interrupters, the operation of which is initiated by a supply of current through a branch path to fuse restraining wires, to operate electromagnetically controlled latches or toggles, to ignite explosive compounds, or to bring about combinations of these actions.

An essential of the new system is the employment of this auxiliary circuit which is energized to operate the interrupting elements whenever the undesirable conditions arise. This branch circuit is controlled, at least in part, by electric contacts which engage and disengage according to the conditions of the circuit and the translating devices being protected. In some embodiments of the invention, these contacts are the contacts of a thermostatic switch and the action is dependent upon the presence or absence of predetermined temperatures in the translating device. In other embodiments, these contacts are the contacts of a switch which is operated as a result of electrical conditions in the circuit and not in consenquence of thermal conditions in the apparatus.

By the use of my new system with its simplified interrupting mechanism, substantial economies are obtained. In prior circuit breaker practices, the circuit breakers themselves, with their various operating coils and other parts, are an expensive item. In contrast to these, the simple interrupters which I employ are of relatively small cost. In one construction, there is a main fuse link, a suitable interrupting means, and means in the branch circuit to actuate the interrupting means. In another construction the main fuse link is replaced by a simple switch. In either construction the parts are few and simple and can be readily and economically assembled. The circuit arrangements are devised so as to make use of simple and economical apparatus.

Another object of the invention is to provide a system which will be reliable and one to be depended upon to bring about the proper protecting circuit interruptions, as well with a fuse as with a switch. In prior art systems where fuses of the class mentioned have been used, there has not been that certainty of action which should obtain in electrical systems of the kind under consideration, but by the new circuits which I employ, such certainty is obtainable both with the fuse type interrupter and with the separable contact or switch type. Such dependability as I now obtain is assured by reason of the use of the auxiliary circuit and its associated parts. Whenever the conditions to be guarded against arise, the normal condition of the auxiliary circuit is modified with the result that the interrupter breaks the main circuit, by blowing the fuse in the fuse type interrupter or by separating the contacts in the switch type.

Having pointed out these objects and features of my invention, attention is directed to the following detailed description and the accompanying drawings, wherein the invention is more fully disclosed, while for a measure of the invention reference should be had to the appended claims.

Figure 7:
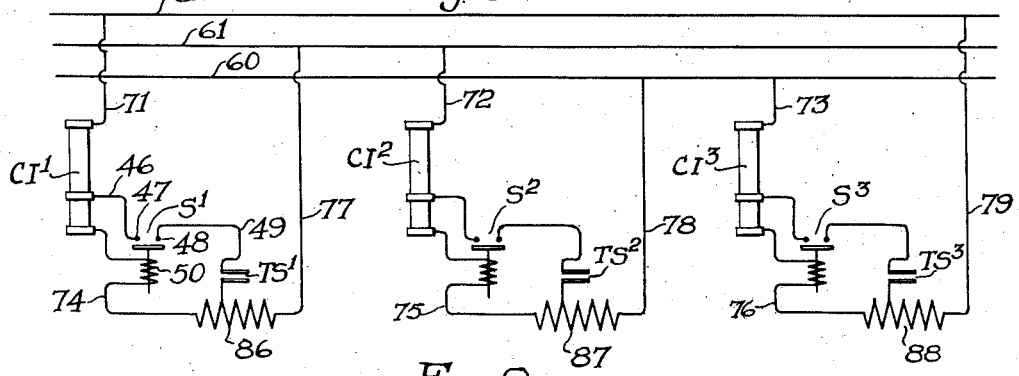
Figure 8:
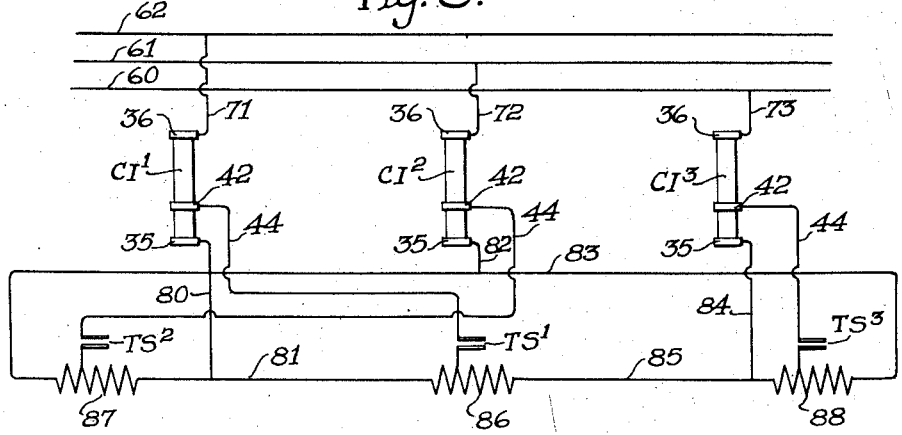
Figure 20:
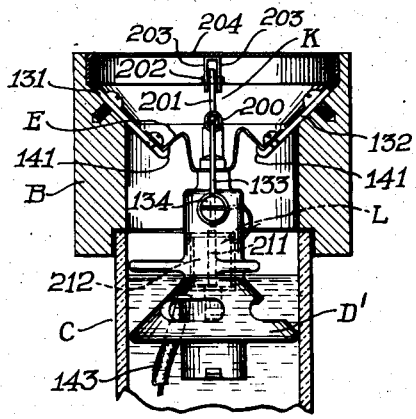
Figure 21:
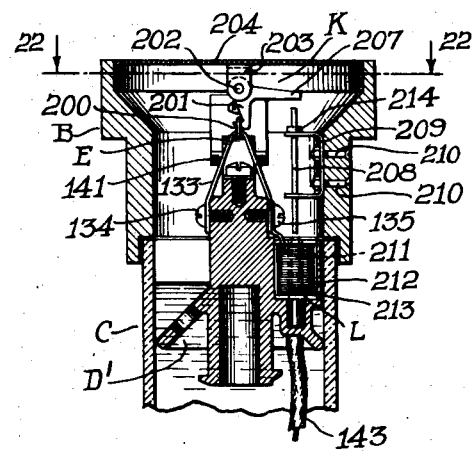
Figure 23:
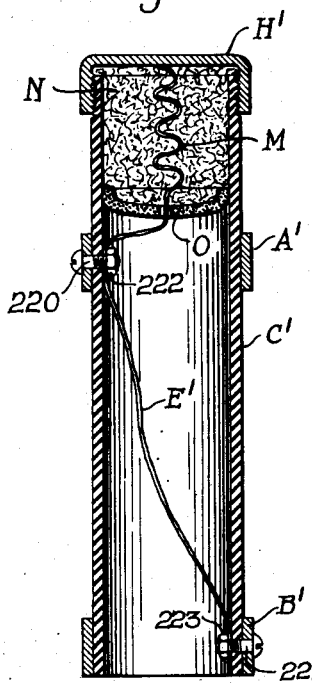
Figure 22:
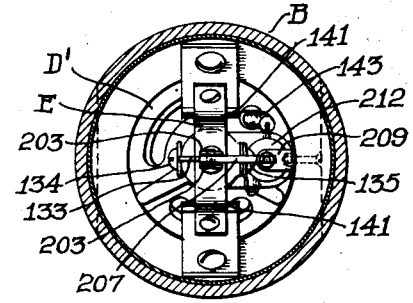
Figure 24:
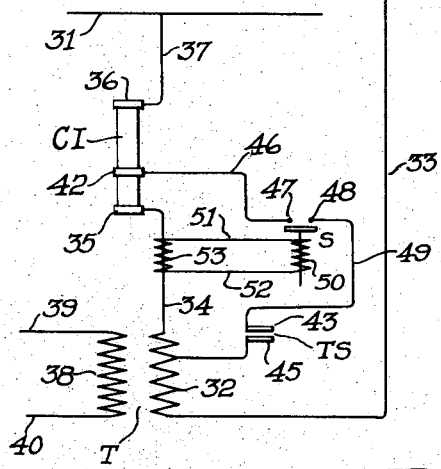
Figure 25:
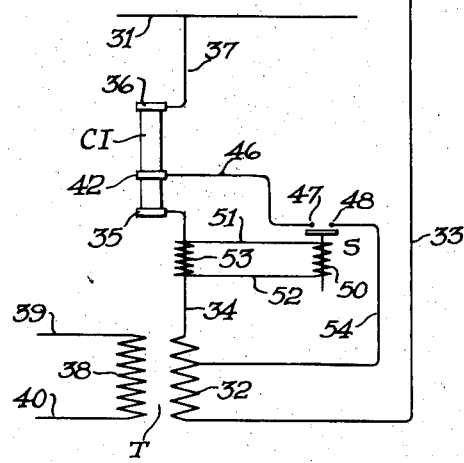
Figure 26:
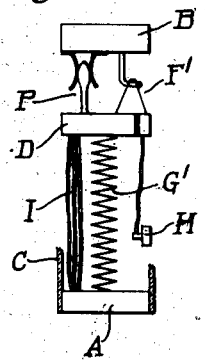
Figure 27:
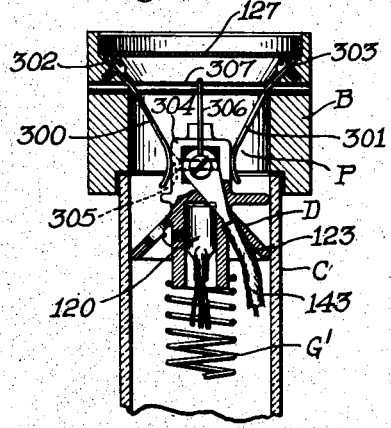
Figure 28:
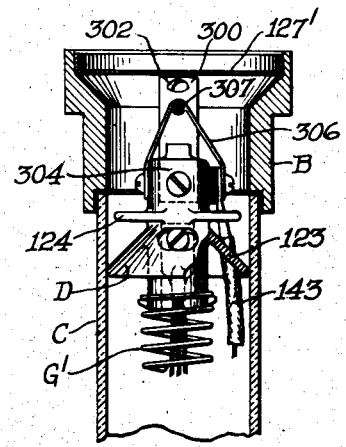

In said drawings, which are largely diagrammatic, Fig. 1 illustrates a protective system constructed and arranged according to the present invention, the same being applied to a single phase circuit wherein the translating apparatus is a transformer and the auxiliary circuit is controlled by a simple thermostatic switch; Fig. 2 is a similar view illustrating a modified control of the auxiliary circuit; Fig. 3 is a diagram illustrating the protective arrangement of Fig. 1 applied to a three phase Y connected circuit; Fig. 4 is a diagram of a portion of the circuit of Fig. 3 modified to include the auxiliary control circuit of Fig. 2; Fig. 5 is a diagram of a single phase circuit controlled as in Fig. 1 except that the thermostatic switch is connected to an auxiliary winding on the transformer instead of being tapped to one of the turns of the regular windings; Fig. 6 is a diagram of a system applied to a three phase circuit, Δ connected and having the simple auxiliary circuit of Fig. 1; Fig. 7 is a diagram of the circuit of Fig. 6 modified to include the auxiliary circuit arrangement of Fig. 2; Fig. 8 is a similar diagram illustrating the invention applied to a three phase circuit, Δ connected and having the simple auxiliary circuit of Fig. 1; Fig. 9 is a view similar to Fig. 8, but modified to show the auxiliary circuit arrangement of Fig. 2; Fig. 10 is a diagram of a circuit interrupter which may be used in any of the previously described systems, the operation depending upon the fusing of holding wires; Fig. 11 is a diagram of a second circuit interrupter which may be similarly used, wherein the auxiliary circuit controls an electromagnetically actuated latch; Fig. 12 is a diagram of an explosive type of interrupter in association with switch contacts which may be used with the circuits of the previous diagrams; Fig. 13 is a central longitudinal section of the structure of the interrupter diagrammatically illustrated in Fig. 10, parts being shown in section; Fig. 14 is a transverse section of the structure of Fig. 13, the plane of section being indicated by the line 14—14 of Fig. 13; Fig. 15 is an end elevation of one of the caps of the same structure; Fig. 16 is a plan view of the plunger or movable terminal of the structure; Fig. 17 is a longitudinal section of the plunger, the plane of section being indicated by the line 17—17 of Fig. 16; Fig. 18 is a longitudinal section of a portion of the same structure, the plane of section being indicated by the line 18—18 of Fig. 14; Fig. 19 is a perspective view of one of the knife edged supports upon which the main fuse strip of this structure is ruptured; Fig. 20 is a view similar to Fig. 18 illustrating how the previously described structure may be modified to incorporate the latch control of Fig. 11; Fig. 21 is a view similar to Fig. 13 illustrating this same modified structure; Fig. 22 is a plan view of the structure of Figs. 20 and 21; Fig. 23 is a sectional view illustrating more particularly the structure of the explosive type structure shown in Fig. 12, the scale being somewhat smaller than that of the immediately preceding figures; Fig. 24 is a diagram similar to Fig. 2 but showing a modified circuit for supplying current to the associated control switch; Fig. 25 is a similar diagram illustrating a branch circuit without a thermostatic switch; Fig. 26 is a diagram of a circuit interrupter much like that of Fig. 10 but having simple switch contacts instead of a main fuse strip for controlling the main circuit; Fig. 27 is a partial sectional view of the structure of Fig. 13 modified to provide the plug switch contacts, the section being taken on the same plane as Fig. 18; and Fig. 28 is a similar view of the same structure, the plane of section being the same as that of Fig. 13. Throughout these views, like characters refer to like parts.

Referring to the drawings and more particularly at first to the single phase circuits, 30 and 31 indicate supply conductors leading from a suitable source of electricity and adapted to be connected to the primary winding 32 of a transformer T. In the case of all the single phase diagrams, the connection between supply wire 30 and the lower terminal of winding 32 is made by conductor 33. In each case the other terminal of the winding 32 is connected by conductor 34 to main clip contact 35. The other main clip contact 36 is connected by conductor 37 to the other supply wire 31. The secondary winding 38 of the transformer T is suitably associated with the primary winding 32 and is connected by conductors 39 and 40 to the service current-consuming devices connected to the secondary circuit. The transformer windings 32 and 38 are electrically associated with each other and with a suitable core, such as the core 41, shown in Fig. 5.

The third fuse engaging clip contact, designated 42, is connected to contact 43 of the thermostatic switch TS by conductor 44 and the other contact 45 of switch TS is connected to one of the turns of the transformer winding 32.

In Fig. 2, the intermediate clip contact 42 is connected by conductor 46 to one terminal 47 of an electromagnetically operated switch S. The other terminal 38 of said switch is connected by conductor 49 to contact 43 of switch TS and contact 45 of said switch is connected as before to one of the turns of transformer winding 32. In this case the conductor 34 includes the winding 50 of the switch S.

In Figs. 24 and 25, the winding 50 of the switch S is included in a local circuit embracing conductors 51, 52 and transformer winding 53. The latter is energized by current through conductor 34 which includes the primary of the transformer. The circuits of Fig. 25 depart still farther from those of Fig. 2 in omitting the thermostatic switch TS and connecting contact 48 of switch S by conductor 54 directly to a turn of the winding 32 of the transformer T.

In lieu of connecting conductor 45 to one of the turns of the winding 32, the transformer T may be provided with an additional winding 55 upon the core 41, as shown in Fig. 5. Such winding 51 will supply a potential sufficient for the operation of the auxiliary circuit. Although this modified connection, employing the extra winding 51, is shown in a circuit arrangement like that of Fig. 1, it will be understood that the same may be used with the circuit arrangement of Figs. 2, 24 and 25 equally as well. In other words, the extra winding is merely a different way of supplying current for the auxiliary circuit.

In the arrangement of Figs. 1 and 5, the auxiliary circuit includes the contacts 43 and 45 of switch TS and the conductor 44. In the arrangement of Figs. 2 and 24 this same auxiliary circuit includes the contacts of switches S and TS and conductors 46 and 49. And in the arrangement of Fig. 25, this circuit includes the contacts 47 and 48 of switch S and conductors 46 and 49'. In each of these figures the circuit interrupter CI is shown in circuit connected with the clips 35, 36, and 42. As we shall see later, the interrupter CI may take the form of any one of the devices diagrammatically illustrated in Figs. 10, 11, 12, and 26 and mechanically depicted in other figures of the drawings.

Turning now to the diagrams which illustrate the protective system applied to the three phase circuits, it will be noted that the simple auxiliary circuit of Fig. 1 is shown in Figs. 3, 6, and 8, while the modified auxiliary circuit arrangement of Fig. 2 is shown in Figs. 4, 7, and 9; similarly, Figs. 3 and 4 show one general circuit arrangement, Figs. 6 and 7 a second and Figs. 8 and 9 a third.

In these three phase circuits, the supply conductors are designated 60, 61, and 62, the circuit interrupters CI$^1$, CI$^2$, CI$^3$, and in the Y connected circuits, the transformers T$^1$, T$^2$, T$^3$. The windings of these Y connected transformers have the same designations as heretofore and the same is true of the auxiliary circuits. The clips into which the fuses are set also have the same designating characters. The lower terminals of the windings 32 of the Y connected transformers, however, are connected to a switch contact 63, which may be left open or by means of contact 64 connected to ground at 65. The upper clips 36 of the three circuit interrupters of the Y connected system are connected respectively to supply mains 61, 62, and 63 by conductors 66, 67, and 68.

If the circuits of Fig. 3 are to be modified so as to show the doubly controlled auxiliary circuit of Fig. 2, then the connections are the same as in Fig. 3 except that conductor 34 includes winding 50 of switch S$^1$, the same as in Fig. 2, and the connections from clip contact 42 extend through conductors 46 and 49 and contacts of switches S$^1$ and TS$^1$, the same as in that figure. Obviously other switches in the series would be similarly connected so that there would be similarly modified branch circuits for each of the interrupters CI$^1$, CI$^2$ and CI$^3$. These will be clear from the diagrams of Figs. 3 and 4 without extended illustration.

In Fig. 6 where the transformer has three windings, 86, 87, and 88, the same supply leads 60, 61, and 62 are connected to these windings in Δ formation. The circuit interrupters CI$^1$, CI$^2$, CI$^3$ are the same as before and the upper clip 36 is connected in the case of interrupter CI$^1$ to supply lead 62 by conductor 71; similarly clip contact 36 of interrupter CI$^2$ is connected to supply lead 61 by conductor 72; and the corresponding clip of interrupter CI$^3$ is connected to supply lead 60 by conductor 73. The main circuit is continued from clips 35 of each of the circuit interrupters to one terminal of each of the transformer windings, conductor 74 being used with interrupter CI$^1$ and winding 86; conductor 75 with interrupter CI$^2$ and winding 87, and conductor 76 with interrupter CI$^3$ and winding 88. The other terminal of each of these windings is connected to the supply circuit by conductors 77, 78, and 79, conductor 77 connecting winding 86 to supply lead 61, conductor 78 connecting winding 87 to supply lead 60, and conductor 79 connecting winding 88 to supply lead 62.

The auxiliary circuits in the case of the arrangement of Fig. 6 are similar in each instance to the corresponding circuit of Fig. 1 and accordingly the same reference characters are used to designate the connections and parts except that the switch associated with winding 86 is designated TS$^1$, that associated with winding 87 is designated TS$^2$, and that associated with winding 88 is designated TS$^3$.

Instead of employing the auxiliary circuit of Fig. 1, the auxiliary circuit of Fig. 2 may be used. In such case, which is illustrated in Fig. 7, the main connections are the same but the auxiliary circuit has the arrangement of Fig. 2 and the parts and connections are designated by the same characters, except that the switches having contacts 47 and 48 are designated S$^1$, S$^2$ and S$^3$ respectively, according to their association with thermostatic switches TS$^1$, TS$^2$ and TS$^3$.

Coming now to the circuit arrangement of Fig. 8, wherein we have the three conductors 60, 61 and 62 of the supply circuit connected to the transformer windings 86, 87 and 88 in Y arrangement, the clips 36 of each of the interrupters CI$^1$, CI$^2$, CI$^3$ are connected by conductors 71, 72, and 73, the same as in Fig. 6. The connections from the clips 35 of these interrupters, however, are different, clip 35 of interrupter CI$^1$ being connected by conductor 80 to the link conductor 81 which joins the right hand terminal of transformer winding 87 to the left hand terminal of winding 86. In like manner, conductor 82 connects the clip 35 of interrupter CI$^2$ to link conductor 83, which joins the right hand terminal of winding 88 to the left hand terminal of winding 87. Again, in the case of interrupter CI³, conductor 84 connects the clip 35 with link conductor 85 which joins the right hand terminal of winding 86 to the left hand terminal of winding 88. These give the main circuit connections.

The auxiliary circuit illustrated in Fig. 8 is the same in character as the auxiliary circuit of Fig. 1 and the parts are designated by similar characters. The thermostatic switches, interrupters, and transformer windings are also associated as before, that is to say, switch TS¹ with interrupter CI¹ and winding 86, switch TS² with interrupter CI² and winding 87, and switch TS³ with interrupter CI³ and winding 88, all as clearly illustrated. When it comes to using the auxiliary circuit of Fig. 2, then the circuit of Fig. 8 is modified as shown in Fig. 9. In the latter figure, the main circuit is the same as that shown in Fig. 8 and the auxiliary circuit is the same as shown in Fig. 2 and has corresponding designating characters, the thermostatic switches TS¹, TS² and TS³ being associated with the transformer windings and interrupters the same as in Fig. 8.

Having pointed out several circuit arrangements which embody the features of my invention, attention may be directed to the character of the interrupters which I employ in association with the various circuits. These have been designated CI, CI¹, CI², and CI³ in the various circuits. In diagram I have illustrated three different interrupting devices suited to operation in these circuits. In Fig. 10 the interrupter is one in which the circuit is broken by the fusing of fine wires; in Fig. 11 the circuit is broken by the tripping of a latch; and in Fig. 12 by the explosion of a confined explosive substance. In these diagrams the interrupters are shown out of engagement with the connecting clips but they have contacting parts for engagement with the clips to form proper circuit connections. These interrupters all have the character of fuses, although, as will be seen, the breaking of the circuit is not always the result of fusing a fusible element. However, if the main circuit be overloaded, the fusible element contained in these interrupters may be fused. This, however, does not necessarily always happen. In some instances, the auxiliary circuit will come into play to break the main circuit.

In each of these diagrams of Figs. 10, 11 and 12, A, B, H, A′, B′ and H′ are clip engaging terminals upon the circuit interrupters. In the structures of Figs. 10 and 11 the terminals A, B and H are fitted to be engaged and held by the clips 35, 36 and 42 respectively. In the structure of Fig. 12 the corresponding terminals A′, B′ and H′ co-operate in like manner with corresponding clips 35′, 36′ and 42′ respectively. These clip contacts 35′, 36′ and 42′ are in turn connected by jumper conductors 90, 91, 92 to plug contacts 35², 36² and 42² which are adapted to be inserted into the clip contacts 35, 36 and 42 respectively. In this way the terminals of the line leads and auxiliary circuits are extended to clips 35′, 36′ and 42′ which are physically positioned to suit the terminal arrangement of the interrupter of Fig. 12.

In the interrupter of Fig. 10, C designates an enclosing casing, D a movable terminal within the casing, E a fusible link, G a tension spring by which terminal D, when freed, is drawn away from terminal B, F a thread-like support for the terminal D against the pull of the spring G, and I conductors between fixed terminal A and movable terminal D.

In the interrupter of Fig. 11, the parts C, D, E, G, and I are the same as in the interrupter of Fig. 10. Here, however, the fine wire supports F give place to the latch mechanism K which is operated by the electromagnet L included in the auxiliary circuit of the interrupter.

In the interrupter of Fig. 12, the casing C¹ is similar to casing C of the other interrupters but it is open at one end, the terminal H¹ being a cap which closes the other end. The terminals A¹ and B¹ are conducting rings secured to the outside of the casing C¹. The link E connects terminal A¹ and B¹ and has the A¹ end connected in series with a heating or firing coil M located in a compacted mass of gun powder or other explosive N positioned between the cap H¹ and a wad or plunger O.

Having pointed out in a general way, by means of the diagrams of Figs. 10, 11 and 12, the character of the structures of the interrupters which may be used, it will be necessary to explain more fully the mechanical construction of these different interrupters. The first to be considered is that diagrammatically illustrated in Fig. 10 and shown more fully in Figs. 13 to 19 inclusive.

As before noted, A and B designate clip engaging terminals, C the casing which is preferably glass tubing; D the movable terminal within the casing, E the main fuse strip, F the thread-like support for the terminal D, G the tension spring by which the freed terminal is drawn away from the terminal B, H the intermediate clip engaging terminal through which the auxiliary circuit of the structure may be closed, and J the quenching liquid contained in the casing C and operative when the fuse is blown to quench the arc formed between the terminals B and D. Obviously, the structure may be built up for use without the liquid J. In such case, the tubing would preferably be composed of bakelite or some similar material. However, the structure will be described as made up for use with the liquid and the tube C will be considered as a glass tube.

The cap A is snugly fitted against the adjacent end of the tube C, and the parts are cemented together with a suitable cementitious material, such as litharge, or are leaded together with a metallic alloy. The opposite end of the tube C is similarly attached to the terminal B. Parallel surfaces 110 on opposite sides of the cap A are adapted to fit against the spring clips 35 when the interrupter is in circuit. Similar surfaces 111 on opposite sides of the terminal B perform a similar function with reference to the spring clips 36.

The interior of the cap A is provided with an annular projection 114 which is threaded for the reception of a terminal member 115. The latter is provided with lugs 116 for the reception of one or more turns at one end of the coiled tension spring G. The other end of the coiled spring G is likewise connected to the skirt of the movable terminal D by means of similar lugs 116' similarly engaging end turns of the spring G.

The member 115, being electrically and mechanically connected to the terminal A, is in turn electrically connected to a terminal 117 at one end of a plurality of flexible insulated conductors I. The terminal 117 closely fits within the bore of the member 115 and is firmly held in place by any suitable means, as a set screw 119. The other end of the conductors I is provided with a similar terminal 120 which likewise snugly fits within the bore of the plunger D and is held in place by any suitable means, such as a set screw 121. Thus the cap terminal A is electrically united through the member 115 and the conductors I to the movable fuse terminal D.

The fuse terminal D, besides having the inner skirt 122, has an outer flaring flange 123 which has a diameter approximately equal to the internal diameter of the tube C. The member D also has three arms 124 which are adapted to engage at their outer ends with the interior of the tube C. The flange 123 and the arms 124 thus serve as guides for the member D as it is moved in the tube C. Normally the plunger D is held in the position illustrated. This is accomplished by the support F. When so positioned and at rest, the contained fluid extends to a point in the neighborhood of, or slightly above, the fuse link E. When the supporting members give way and the plunger D is drawn down by the spring G, then the flange 123, by closely engaging with the walls of the tube C, insures a flow of the liquid J through the openings 125, 126, and 127 formed in the inclined flange 123. By this means the liquid is projected in forceful streams against any arc which may be formed by reason of the rupture of the strip E. Normally the outer end of the terminal B is closed by an end plate 127' which is flanged at its periphery so as to fit snugly within the bore of the terminal at its outer end. The plate is secured to the terminal at its periphery by jeweler's cement or the like. Besides being weakly secured in place it is itself quite thin. Consequently, when the fuse blows, the plate 127' may be readily dislodged, thereby leaving the top of the terminal open for the escape of gases and products of combustion under pressure.

The cross wire structure F constitutes the main support for the plunger D and it is by means of this structure that the plunger is held adjacent to the fuse terminal B against the tension exerted by the spring G which at this time is stretched and exerts a strong pull upon the member D. The cross wire structure includes a fine wire 128 which is secured at its opposite ends to the terminal B by any suitable means, such as screws 129 and 130, which, be it noted, also secure the knife edge members 131 and 132 respectively to the same terminal. A wire 133 passes over the wire 128 and is secured at its lower ends to the plunger fuse terminal D. This wire may also be secured in various ways. It is shown as connected at one end to the terminal D by the screw 134 and at the other end by the screw 135 to the insulating block 136 mounted in an opening in the side of the terminal D. A short tube 137 of conducting material encloses the wire 128 and serves as a wearing saddle for the wire 133. It will be seen that the wire 128 is electrically in contact with the terminal B at all times. One end of the wire 133 is likewise electrically connected at all times to the terminal D, but the other end of the wire 133 is electrically connected to the screw 135 which is insulated from the member D by the block 136. The tube 137 is merely used for the purpose of protecting the wires and preventing the one cutting too readily through the other. This tube also serves as a conductor of electricity between the two wires. The wires 128 and 133 are preferably fine steel wires having high tensile strength. Although this is preferable it will be understood that other like materials may be used in place of steel without departing from the spirit of my invention.

The main fuse E extends between the fuse terminals B and D in two branches. This construction is employed with the intent that when the link E is being cut by the knife edges 141 substantially equal forces are applied to the moving terminal D, as a single unbalanced force would tend to cause the terminal D to assume a position not in alignment with the glass tube C with consequent reduction in the speed of operation. Although this is preferable it will be under stood that a single fuse link equivalent to one-half of link E as shown may be employed without departing from the spirit of my invention. The two branch connection is brought about by connecting the center of the strip E mechanically and electrically to the top of the plunger D. This may be done by any suitable means, as a screw 139, the latter passing through an opening in the strip and being screwed into a threaded opening 140 in the top of the plunger D. The ends of the strip E are electrically and mechanically fastened to the protruding ends of the supporting members 131 and 132. As clearly shown, the free end of each of the members 131 and 132 is provided with an upturned knife edge 141 over which the strip E extends and adjacent to which it is electrically and mechanically connected by any suitable means, as a screw 142. Adjacent to the knife edges 141 the strip E is bent upward to provide loops on either side of the screw 139 and in this way slack is provided which allows the terminal D to have considerable freedom of movement, in case either of the wires 128 or 133 is broken, before pulling out the slack in the strip E and making the latter taut. When this taut condition is established, the knife edges 141 cut the strip and so break the circuit which would normally flow between the terminals B and D through the strip E.

The auxiliary circuit extends from the screw 135, mounted in the insulating block 136 in the terminal D through an insulated wire 143 extending to the clip-engaging terminal H. The wire 143 is provided at the end adjacent to the plunger with the terminal 144 through which the screw 135 passes. The block 136 is preferably held firmly within the terminal D by a transverse screw 145 and the end of the wire 143 adjacent to the terminal H is connected to the inner end of a pin 146 which extends through an opening in the tube C and is secured at its outer end to the terminal H by any suitable means, such as solder. In order to properly seal the opening through which the pin 146 passes, a suitable sealing material, such as litharge or a metallic alloy, should be employed.

When the parts are put together in the manner described, the interrupter is ready for insertion into the clips 35, 36 and 42 of the supporting structure, the terminal A being between clips 35, the terminal H between clips 42 and the terminal B between clips 36. As before noted, clips 35 and 36 constitute the terminals of the main circuit and the clips 42 are included in the auxiliary circuit.

With this thin wire interrupter in the circuit of Fig. 1 it will be seen that current will normally flow over a path between the supply wires which may be traced from supply wire 30 through conductor 33, primary transformer winding 32, clips 35, terminal A, strands I, movable terminal D, fuse strip E, contact B, clips 36 and conductor 37 to the return wire 31 of the supply circuit. It will be noted that the current passing between terminals B and D will pass through the fuse strip E. It will also be seen that there is a path for current between these same two terminals B and D through wire 133, wear saddle 137 and wire 128. In case of a short circuit, there will be a heavy flow of current through the circuit just traced. The fuse strip E, and immediately thereafter one or both of the wires 128 or 133, will be heated to a point of rupture. As a result, the terminal D will be jerked quickly toward the cap A by the spring G. Any arc that is formed between the terminals B and D will be quenched by the flow of the liquid J through the openings 125, 126 and 127 in the flange 123 of the terminal D.

In a case of a heavy overload upon the transformer the circuit just described will be ruptured in the same way.

On the other hand, if there is a slight overload, but one which continues a long time, injury to the transformer winding might result if it were not for the presence of the auxiliary local circuit including the thermostatic switch TS. The heating up of the transformer will cause the thermostatic switch to close its contacts 43, 45 and permit current to circulate in the local auxiliary circuit. Such local circuit may be traced from the tapped point in the winding 32 of the transformer T, through thermostat contacts, 45, 43, wire 44, clip contact 42, contact ring H, post 146, conductor 143, terminal 144, wire 133, main terminal D, conductor strands I, cap A, clip contact 35, and wire 34 to the upper terminal of the transformer winding 32. The current circulating in this local circuit will immediately heat the included wire 133 to the point of rupture and terminal D will thereupon be released. It will then promptly respond to the pull of the spring G and draw the strip E sharply against the knife edges 141. The strip E will thus be severed and the circuit opened. In the meantime the liquid J rushing against the parts above the terminal D will promptly quench any arc that might be formed between the terminals.

Where no liquid J is used, the throw of the lower terminal D is relied upon to break the circuit by a separation sufficient to prevent undue arcing.

With the thin wire interrupter of Fig. 10 in the circuit of Fig. 2, the main circuit current flow will be the same as traced in connection with the description of the same interrupter in the circuit of Fig. 1 except that the coil 50 of switch S will be included in this circuit. In case of a short circuit the fuse strip E will be ruptured just as before described. The current flowing at such time will cause switch S to close its contacts 47, 48 but such partial closing of the auxiliary circuit will do nothing by way of that circuit because it will be open at contacts 43, 45 of switch TS.

The same operations will occur upon the occurrence of a heavy overload.

But if there be a prolonged slight overload, then contacts 47, 48 of switch S will be closed, since such closure occurs at or above full load current in the primary winding 32. In such case if the transformer T is heated to or beyond a certain definite temperature then contacts 43, 45 of the thermostatic switch TS will close and the closing of the auxiliary circuit through wire 133 will rupture the circuit as before described. In these ways the translating apparatus T is protected. And such would be the case no matter whether such apparatus were a transformer, motor, generator or like equipment intended to receive and modify energy.

Obviously, from what has been said it will be readily understood how the main circuits will be interrupted in the system circuits of the other figures and how the added coil 51 of Fig. 5 will operate in lieu of tapping a turn of the transformer winding 32. Specific description of these operations is therefore omitted.

Turning now to the mechanical structure of the interrupter illustrated in Fig. 11, it will be seen that it will only be necessary to replace the cross wire structure F of the previously described structure by one wire, a latch K for holding it and a suitable solenoid mechanism L for operating the latch. These modified parts are illustrated in Figs. 20, 21, and 22. Except for a few changes hereinafter noted, the structure will be the same as shown in Figs. 13 to 19, inclusive. As before, the supporting wire 133 is secured to the plunger by screws 134 and 135 but in this case, the plunger, designated $D^1$, is a modification of the plunger D. It does not have the insulating block 136, the head of the plunger being left solid at this point. It is also modified to provide for the mounting of the solenoid mechanism L. At its center the supporting wire 133 passes through a small ring 200, which is adapted to receive the lower end of a latch 201, which is pivoted at 202 to lugs 203 extending downward from a disklike supporting member 204 which constitutes the upper closing member of the structure, similar to the closing disk 127' of the previous structure. The parts 201, 202, 203 and 204 are preferably composed of bakelite, fiber or other suitable insulating material. If desired the flanged member 204 may be secured in position by jeweler's cement or like material, just as the capping disk 127'.

The downwardly extending hook 201 of the latch mechanism K is provided with a horizontal arm 207 which reaches outward far enough to bring its outer end directly above, and in position to be engaged by, a striker rod 208 which passes freely through openings in outstanding lugs on bracket 209 which is secured to the terminal contact B in any suitable way, as by screw bolts 210. The lower end of the rod 208 is in alignment with the vertically movable plunger 211 of a solenoid 212 positioned in a suitable pocket 213 formed in the plunger terminal $D^1$. Preferably the bracket 209 is also composed of insulating material.

In this case, the auxiliary circuit which includes conductor 143 also includes the winding of solenoid 212. One end of the solenoid winding is connected to wire 143 and the other end is connected directly to plunger $D^1$ by means of screw 135. Obviously, whenever this auxiliary circuit is energized, the armature core 211 will be thrust upward against the lower end of rod 208 which is normally held from falling below the desired position by a projection or collar 214 on the rod. This collar will not pass through the opening in the upper lug, of the bracket 209 and hence holds the rod normally at rest with its lower end a little above the upper end of the solenoid core 211.

When the upwardly moving core 211 engages the rod 208, the latter delivers a blow at its upper end against the latch arm 207. This upward blow rocks the latch about its pivot 202 and as a result the hook 201 is withdrawn from the ring 200. Thereupon, the movable terminal $D^1$ will be drawn downward with a resultant severing of the fuse strip E upon the knife edges 141 of the structure in the same manner as described heretofore. In other words, the same result will be brought about by tripping the latch as was brought about by the fusing of the wires in the structure diagrammatically shown in Fig. 10.

When we come to the structure of the interrupter diagrammatically illustrated in Fig. 12, the parts are relatively few and simple and do not depart materially from what is shown in that diagram. In this case, the casing $C^1$ is preferably composed of bakelite, fiber or other suitable insulating material. It is closed at one end by the cap $H^1$ and the space between the cap $H^1$ and the wad or plunger O is provided for the explosive charge N. Through the charge extends the heating or exploding wire M, preferably in the form of a bare wire coiled or folded back and forth as shown. One end of the wire is soldered or otherwise electrically connected to the terminal cap $H^1$ and the other end extends through a small opening in the plunger O into electrical engagement with the terminal $A^1$ which is in the form of a ring extending around the casing $C^1$. The rest of the circuit includes the conductor $E^1$ which extends through the space 219 beneath the plunger O and is connected at its lower end to the lower terminal $B^1$. Obviously, the main circuit will extend between terminals A¹ and B¹ and will include fuse link E¹, while the auxiliary circuit will extend through the heating coil M and the cap H¹. Whenever the latter circuit is established and the explosive charge is heated, the necessary result is the sudden production of explosive gases which promptly eject all parts from the interior of the casing C¹ and thus completely interrupt the circuit between terminals A¹ and B¹. The terminal rings A¹ and B¹ are provided with bolts 220, 221 and nuts 222 and 223 for connecting the link E¹ in circuit. The bolts pass through openings in the casing C¹ and terminals A¹ and B¹ respectively and when the nuts are screwed home the conductor beneath them is effectively electrically connected to the terminals.

The fuse link E' of the explosion interrupter stands in the same relation to the circuit connections as do the links E of the other interrupters. Consequently, it will operate in the same way. Therefore, what has been said about the operation of the fine wire interrupter and the latch controlled interrupter will apply to this interrupter as well. But when it comes to the auxiliary circuit through firing coil M, the action is necessarily different by reason of firing the explosive charge. The rupture takes place under like conditions of completing the auxiliary circuit but the effect is to violently eject from the casing all the parts and materials within the casing including the wad O and the fuse link E'. Such action, of course, completely and satisfactorily interrupts the main circuit between the main supply leads.

Now instead of having interrupters in which the main circuit passes through a fusible link, and instead of relying upon the rupturing of that link to break the circuit, I may employ simple switch contacts and separate them to interrupt the main circuit. This substitution of switch contacts for a fusible link may be done without greatly modifying the structure already described. Such a modified structure is diagrammatically illustrated in Fig. 26 and structurally in Figs. 27 and 28. In the arrangement of this modification the fine wire support is employed and in this way the structure is much like that diagrammatically illustrated in Fig. 10 and structurally shown in Figs. 13 to 19 inclusive. The parts in the switch type interrupter which have not been changed are given the same designating characters as in the earlier figures. The switch which takes the place of the fuse link E of the earlier structure is shown as a simple plug switch P. It comprises two flexible spring contacts 300 and 301 secured at their upper ends to the inclined portions of the walls of the terminal B, preferably by screws 302 and 303, respectively. The spring contacts 300 and 301 are laterally yielding at their lower ends and are shaped and positioned so as to receive between them the upper end 304 of the plunger terminal D. Thus the contacts 300 and 301 form the socket member of the switch, and the plunger D with its contact engaging end 304 constitutes the plug member of the switch. Two faces of the end 304 are made smooth so as to make proper sliding engagement with the contacts 300 and 301. This merely requires that the screw 145 of the previous structure be replaced by a flat-headed screw 305.

The fine wire supporting structure F' comprises in this instance but a single fine wire 306 which is secured to the plunger D the same as the wire 133 of the prior structure but instead of cooperating with a wire cooperates with a rod 307 which spans the opening in the terminal B to which it is securely connected. Obviously such connection may take different forms. In the embodiment shown, the rod 307 extends through diagrammatically opposite openings in the annular wall of the terminal and because of the positioning of the springs 300 and 301, also through openings in said springs.

In service the switch P will be normally closed as shown. When the auxiliary circuit through conductor 143 is closed due to either electrical or thermal control or both, as the case may be, the wire 306 is melted and can no longer hold the plug contact in engagement with the spring contacts 300 and 301 against the pull of the actuating spring G' which is the same as the spring G previously described except that it is larger and stronger, and thus exerts a greater force. The resulting downward pull of the terminal D, once the holding wire 306 is fused, separates the contacts of the switch P and opens the main circuit. As the plunger D moves downward the liquid J, if such liquid be used, passes through the openings in the flange 123 and serves to direct a stream against any possible arc forming between the separating contacts.

It will be apparent that with the switch type interrupter certain electrical conditions may arise which will not bring about an interruption of the circuit as would be the case were a fuse type interrupter employed. However, the switch type may be found useful in situations where it would not be desirable to use the fuse type.

If the switch type interrupter be employed in a circuit such as shown in Fig. 24, then upon the occurrence of a short circuit there would be a heavy flow of current through the interrupter but this would merely close the auxiliary switch S and hold it closed and the circuit would not be interrupted until the translating device T had become sufficiently heated to close the thermostatic switch TS and thus close the auxiliary circuit. The closing of the auxilary circuit would then release the plunger as before explained and cause the main circuit to be broken. Of course, if the short circuit did not persist long enough to heat up the device T, then with this circuit arrangement there would be no interruption of the main circuit. In this way the switch type interrupter distinguishes from the fuse type as will be obvious.

In case of a heavy overload the same operations would occur.

On the other hand if there is a slight overload but one which continues a long time, then the translating device T would become overheated and close the thermostatic switch TS. At the same time the contacts of control switch S would be closed since such closure occurs at or above full load current in the main circuit. The closing of the auxiliary circuit will bring about an operation of the switch type interrupter just as before explained.

If the circuit arrangement of Fig. 25 be employed, then upon a short circuit or a heavy current flow, the control switch S would be closed and the switch type interrupter promptly operated to break the main circuit through it. The same would happen with the control switch set to close its contacts at or above full load current in the primary of the associated transformer T.

When the arrangement of Fig. 25 is used with the switch type interrupter, a very prompt interruption of the main circuit is accomplished as soon as the auxiliary circuit is closed by the control switch S which may be set to close its contacts at any desired current value in the conductor 34. This arrangement may be used to advantage in protecting long circuits where if there is to be protection there must be quick action. With this arrangement, obviously, the operation of the interrupter is independent of thermal conditions but depends wholly upon electrical conditions.

In view of what has been described and illustrated, it should not be difficult to suit the single-phase arrangement of Fig. 25 to multi-phase circuits and therefore no attempt will be made to bring such modifications in the present disclosure.

The various interrupters which I have employed are all of the cartridge form and as soon as one has operated another may be readily substituted. The structure shown in these interrupters are to some extent typical and not commercial in form.

In carrying out my invention many alterations may be made in the electrical and mechanical arrangements disclosed without departing from the spirit and scope of the invention. I therefore do not wish to be unduly limited in respect to details and adaptations but aim to cover by the terms of the appended claims all those variations in structure and use which rightly come within the scope and spirit of my invention.

What I claim as new and desire to secure by a patent of the United States is:

1. In an electric system, supply mains, an electric translating device in circuit with said supply mains, a circuit interrupter having a main fuse link fusible by excess current in said circuit and additional means for rupturing said link in response to current in an auxiliary path, a thermostatic switch operative in response to the heating of said translating device, and means dependent upon the operation of said thermostatic switch to pass a current derived from said supply mains through said auxiliary path to actuate said link rupturing means to interrupt said circuit, the potential impressed on said auxiliary path being materially below the potential between said supply mains.

2. In an electric system, supply mains; an electric translating device in circuit with said supply mains; a circuit interrupter having a main fuse link, fusible by excess current in said circuit, a branch path for current, and additional link rupturing means operated by current in said path; a thermostatic switch associated with said translating device operative to close its contacts upon the overheating of said translating device; and means dependent upon the closing of said thermostatic contacts to complete an energizing circuit through said branch path to operate said rupturing means to interrupt said circuit.

3. In an electric system, supply mains, an electric translating device in circuit with said supply mains, circuit interrupter having a main fuse link, fusible by excess current in said circuit and additional means for rupturing said link in response to current in an auxiliary path, an electroresponsive device in said main circuit, a thermostatic switch operative in response to the heating of said translating device, and means under the joint control of said thermostatic switch and said electroresponsive device to complete a circuit through said auxiliary path to actuate said link rupturing means to interrupt said circuit.

4. In an electric system, supply mains; an electric translating device in circuit with said supply mains; a circuit interrupter having a main fuse link fusible by excess current in said circuit, a branch path for current, and additional link rupturing means operated by current in said path; an electroresponsive device in said main-circuit; a thermostatic switch associated with said translating device operative to close electric contacts upon the overheating of said translating device; and means under the joint control of said thermostatic contacts and said electroresponsive device to complete a circuit through said branch path to actuate said link rupturing means to interrupt said circuit.

5. In an electric system, supply mains, an electric translating device in circuit with said supply mains, a circuit interrupter having a main fuse link fusible by excess current in said circuit and additional means for rupturing said link in response to current in a branch path, a thermostatic switch having one terminal connected to a winding of said translating device, and means for connecting the other terminal of said switch to said branch path to complete a circuit therethrough to actuate said link rupturing means to interrupt said circuit.

6. In an electric system, supply mains; an electric translating device in circuit with said supply mains; a circuit interrupter having a main fuse link fusible by excess current in said circuit, a branch path for current, and additional link rupturing means operated by current in said path; a thermostatic switch having one terminal connected to a winding of said translating device, the thermostatic elements of said switch being located within the heating influence of said translating device; and conductors for connecting the other terminal of said thermostatic switch to said branch path to complete a circuit therethrough to actuate said link rupturing means to interrupt said circuit.

7. In an electric system, supply mains; an electric translating device in circuit with said supply mains; a circuit interrupter having a main fuse link fusible by excess current, in said circuit, a branch path for current, and additional link rupturing means operated by current in said path; a thermostatic switch having one terminal connected to a winding of said translating device, the thermostatic elements of said switch being located within the heating influence of said translating device, an electromagnetically operated switch responsive to increased current through said main circuit to close its contacts, and connecting means for electrically connecting the other terminal of said thermostatic switch to a contact of said electromagnetically operated switch and the other contact of said latter switch to said branch path, whereby upon the closing of said two switches current will flow through said branch path to actuate said rupturing means to thereby interrupt said circuit.

8. In an electric system, supply mains; an electric translating device in circuit with said supply mains, a circuit interrupter having a main fuse link fusible by excess current in said circuit and additional means for rupturing said link in response to current in a branch path, an electromagnetically operated switch in said main circuit, a thermostatic switch operative in response to the heating of said translating device, and means under the joint control of said switches to complete a circuit through said branch path to actuate said link rupturing means to interrupt said circuit.

9. In an electric system, supply mains; an electric translating device in circuit with said supply mains; a circuit interrupter having main fuse link fusible by excess current in said circuit, a branch path for current, and additional link rupturing means operated by current in said path; an automatic switch having its actuating coil included in said main circuit and contacts movable into closed position in response to increased current in said main circuit; a thermostatic switch associated with said translating device and operative to close its contacts upon the overheating of said translating device; and means under the joint control of said switches to complete a circuit through said branch path to actuate said link rupturing means to interrupt said circuit.

10. In an electric system, supply mains, an electric translating device in circuit with said supply mains, a circuit interrupter having a main fuse link fusible by excess current in said circuit and additional means for rupturing said link in response to current in a branch path, an electromagnetically operated switch having a winding in said main circuit, a thermostatic switch having one terminal connected to a winding of said translating device and the other terminal to a contact of said electromagnetically operated switch, and means for connecting the other contact of said latter switch to said branch path to complete a circuit therethrough to actuate said rupturing means to interrupt said circuit.

11. In an electric system, supply mains; an electric translating device in circuit with said supply mains; a circuit interrupter having a main fuse link fusible by excess current in said circuit and additional means for rupturing said link in response to current in an auxiliary path; and means for passing a current derived from said supply mains through said auxiliary path, the potential impressed on said auxiliary path being materially below the potential between said supply mains.

12. In an electric circuit, supply mains; an electric translating device in circuit with said supply mains; a circuit interrupter having a main fuse link fusible by excess current in said circuit, a branch path for current and additional link rupturing means operated by current in said branch path, and means for passing current derived from said supply mains through said branch path to operate said additional means, the potential impressed on said branch path being materially below the potential between said supply mains.

13. In an electric system, supply mains; an electric translating device in circuit with said supply mains; a circuit interrupter having a main current path normally included in said circuit, an auxiliary path branching out from said main path, and means responsive to current in said branch path to actuate said interrupter to open said main current path; a thermostatic switch operative in response to the heating of said translating device; the potential across said thermostatic switch when open being materially below the potential between said supply mains; and means dependent upon the operation of said thermostatic switch to supply current derived from said supply mains to said branch path to interrupt said main circuit.

14. In an electric system, supply mains; an electric translating device in circuit with said supply mains; a circuit interrupter having a main current path normally included in said circuit, an auxiliary path branching out from said main path, and means including an element fusible by current in said branch path to actuate said interrupter to open said main current path; a thermostatic switch operative in response to the heating of said translating device; the potential across said thermostatic switch when open being materially below the potential between said supply mains; and means dependent upon the operation of said thermostatic switch to supply current derived from said supply mains to said branch path to interrupt said main circuit.

15. In an electric system, supply mains; an electric translating device in circuit with said supply mains; a circuit interrupter having a main current path normally included in said circuit, an auxiliary path branching out from said main path, and means responsive to current in said branch path to actuate said interrupter to open said main current path; and means responsive to variations in the electrical conditions of said circuit to supply current derived from said supply mains to said branch path to interrupt said main circuit, the potential impressed on said branch path being materially below the potential between said supply mains.

16. In an electric system, supply mains; an electric translating device in circuit with said supply mains; a circuit interrupter having a main current path normally included in said circuit, a branch current path, and an element fusible by current in said branch path to actuate the interrupter to open said main current path; and means responsive to changes in the electrical conditions of said circuit to supply current derived from said supply mains to said branch path to interrupt said main circuit, the potential impressed on said branch path being materially below the potential between said supply mains.

17. In an electric system, supply conductors; a circuit interrupter having a main current path normally included in circuit with said conductors, an auxiliary current path, and means responsive to current in said auxiliary path to cause the interrupter to open said main circuit; and means responsive to variations in the electrical condition of said conductors to impress a potential, proportional to but less than the potential existing between said supply conductors, on said auxiliary path to cause current to flow therein to bring about the interruption of said main circuit.

18. In an electric system, supply conductors; a circuit interrupter having a main current path normally included in circuit with said conductors, a branch path for current, and an element in said path fusible by current therein to cause the interrupter to open said main circuit; and means responsive to variations in the electrical condition of said conductors to impress a potential, proportional to but less than the potential existing between said supply conductors, on said auxiliary path to cause current to flow therein to bring about the interruption of said main circuit.

JAMES H. STARR.